(12) United States Patent
Kobayashi et al.

(10) Patent No.: US 10,553,909 B2
(45) Date of Patent: Feb. 4, 2020

(54) BATTERY PACK

(71) Applicant: TOYOTA JIDOSHA KABUSHIKI KAISHA, Toyota-shi, Aichi-ken (JP)

(72) Inventors: Takenori Kobayashi, Toyota (JP); Nobuyoshi Fujiwara, Nagoya (JP); Kiyonari Kojima, Miyoshi (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/601,168

(22) Filed: May 22, 2017

(65) Prior Publication Data

US 2017/0346139 A1 Nov. 30, 2017

(30) Foreign Application Priority Data

May 24, 2016 (JP) ................................. 2016-103343

(51) Int. Cl.
*H01M 10/28* (2006.01)
*H01M 2/04* (2006.01)
(Continued)

(52) U.S. Cl.
CPC .......... *H01M 10/281* (2013.01); *H01M 2/04* (2013.01); *H01M 10/0445* (2013.01);
(Continued)

(58) Field of Classification Search
CPC ....... H01M 2/10; H01M 2/1016–1083; H01M 2/20–24; H01M 10/42;
(Continued)

(56) References Cited

U.S. PATENT DOCUMENTS

2002/0102457 A1* 8/2002 Oogami ............... B60L 3/0046
429/159
2005/0079408 A1* 4/2005 Hirano ............... H01M 2/1083
429/82
(Continued)

FOREIGN PATENT DOCUMENTS

CN 104823302 A 8/2015
EP 2 693 519 A1 2/2014
(Continued)

*Primary Examiner* — Jonathan G Leong
*Assistant Examiner* — Jacob Buchanan
(74) *Attorney, Agent, or Firm* — Sughrue Mion, PLLC

(57) ABSTRACT

A battery pack includes a plurality of battery modules that includes a plurality of battery cells, a battery cell holder, a second-electrode assembly including a plurality of second-electrode bus bar plates, a first-electrode assembly, and a cover. The first-electrode assembly includes a plurality of first-electrode bus bar plates, a first-electrode terminal, a second-electrode terminal connected to one of the plurality of second-electrode bus bar plates, and an inter-electrode bus bar connecting the second-electrode bus bar plate and one of the first-electrode bus bar plate and the first-electrode terminal. The first-electrode assembly is in a first pattern or a second pattern. An arrangement of the first-electrode terminal and the second-electrode terminal in the battery module differs according to the pattern of the first-electrode assembly.

4 Claims, 11 Drawing Sheets

(51) Int. Cl.
*H01M 10/04* (2006.01)
*H02J 7/00* (2006.01)
(52) U.S. Cl.
CPC ........... *H01M 10/288* (2013.01); *H02J 7/007* (2013.01); *H02J 7/0019* (2013.01); *H02J 7/0026* (2013.01)
(58) Field of Classification Search
CPC ......... H01M 10/425–4257; H01M 10/60–643; H01M 10/655–6561
See application file for complete search history.

(56) References Cited

U.S. PATENT DOCUMENTS

| | | | |
|---|---|---|---|
| 2010/0116570 A1 | 5/2010 | Sugawara et al. | |
| 2010/0266887 A1* | 10/2010 | Sekino | H01M 2/1016 429/123 |
| 2011/0195284 A1* | 8/2011 | Yasui | H01M 2/0242 429/82 |
| 2013/0183573 A1 | 7/2013 | Yoshioka et al. | |
| 2013/0273398 A1* | 10/2013 | Hoshi | H01M 2/1077 429/61 |
| 2014/0322581 A1* | 10/2014 | Ruter | H01M 2/1072 429/120 |
| 2014/0322582 A1* | 10/2014 | Ruter | H01M 2/1072 429/120 |
| 2015/0255225 A1* | 9/2015 | Kusaba | H01M 10/625 429/120 |

FOREIGN PATENT DOCUMENTS

| | | | | |
|---|---|---|---|---|
| JP | 2001-266825 A | 9/2001 | | |
| JP | 2009-87720 A | 4/2009 | | |
| JP | 2010-113999 A | 5/2010 | | |
| WO | WO-2014083600 A1 * | 6/2014 | ......... | H01M 10/625 |

* cited by examiner

BATTERY PACK

INCORPORATION BY REFERENCE

The disclosure of Japanese Patent Application No. 2016-103343 filed on May 24, 2016 including the specification, drawings and abstract is incorporated herein by reference in its entirety.

BACKGROUND

1. Technical Field

The disclosure relates to a battery pack that includes two or more battery modules connected in series to each other.

2. Description of Related Art

There is known a battery pack in which a plurality of battery cells are modularized into battery modules and these battery modules are connected in series to each other. Japanese Patent Application Publication No. 2010-113999 (JP 2010-113999 A) discloses a battery pack in which two battery modules each formed by modularizing a plurality of battery cells are connected in series to each other.

In JP 2010-113999 A, the two battery modules have the same configuration. For connecting these two battery modules in series to each other, a positive-electrode terminal of one of the battery modules is connected to a negative-electrode terminal of the other battery module.

SUMMARY

In recent years, an increase in the capacity of battery packs has been required, and accordingly, an increase in the number of battery modules connected in series to each other has been required. When mounting a number of battery modules, it may be considered to arrange those battery modules not only in one direction, but two-dimensionally in terms of space. In such a case, when those battery modules all have the same configuration, the length of wires that connect the battery modules in series to each other may become long or the path of the wires may become complicated. When the wires become long, the accessible range of the wires is expanded. When the accessible range of the wires is expanded or the path of the wires becomes complicated in this way, the possibility of connecting the wires to wrong portions may become high correspondingly. As a result, the possibility of wrong wire connection of the battery modules may become high.

Accordingly, it may be considered to provide a special shape per battery module and per wire so as not to allow connection between the battery module and the wire that do not correspond to each other. However, providing the special shape for each of the battery modules and the wires that are large in number may cause an increase in the number of kinds of components and an increase in the number of assembly steps.

The disclosure provides a battery pack that can prevent wrong wire connection between battery modules while suppressing an increase in the number of kinds of components.

An aspect of the disclosure provides a battery pack. The battery pack includes a plurality of battery modules. The plurality of battery modules are connected in series to each other. The plurality of battery modules each include a plurality of battery cells, a battery cell holder, a first-electrode assembly, a second-electrode assembly, and a cover. The battery cell holder holds the plurality of battery cells. The first-electrode assembly includes a plurality of first-electrode bus bar plates, a first-electrode terminal, a second-electrode terminal, and an inter-electrode bus bar. The second-electrode assembly includes a plurality of second-electrode bus bar plates. The plurality of first-electrode bus bar plates each electrically connect first electrodes of two or more of the plurality of battery cells to each other. The first-electrode terminal is connected to one of the plurality of first-electrode bus bar plates. The second-electrode terminal is connected to one of the plurality of second-electrode bus bar plates. The inter-electrode bus bar connects the second-electrode bus bar plate and one of the first-electrode bus bar plate and the first-electrode terminal. The plurality of second-electrode bus bar plates each electrically connect second electrodes of two or more of the plurality of battery cells to each other. The cover covers at least a part of the battery module. The first-electrode assembly is in one of a first pattern and a second pattern. In the first pattern, the first-electrode terminal and the second-electrode terminal are arranged in a first arrangement. In the second pattern, the first-electrode terminal and the second-electrode terminal are arranged in a second arrangement. The second arrangement is different from the first arrangement. An arrangement of the first-electrode terminal and the second-electrode terminal in the battery module differs according to the pattern of the first-electrode assembly used in each of the plurality of battery modules.

With this configuration, the arrangement of the first-electrode terminal and the second-electrode terminal can be changed only by changing the first-electrode assembly. In other words, it is not necessary to change the shape or the like of a component other than the first-electrode assembly for the purpose of changing the arrangement of the first-electrode terminal and the second-electrode terminal. As a result, it is possible to arrange the first-electrode terminal and the second-electrode terminal at desired positions and to prevent wrong wire connection between the battery modules while suppressing an increase in the number of kinds of components.

In the battery pack described above, the plurality of battery cells, the battery cell holder, the second-electrode assembly, and the cover may be the same between the plurality of battery modules.

With this configuration, since the components other than the first-electrode assembly can be configured the same, it is possible to reduce the number of kinds of components.

In the battery pack described above, the first-electrode assembly may have an intake hole and a discharge hole. The intake hole may be arranged so as to lead cooling air into the battery module. The discharge hole may be arranged so as to discharge the cooling air having passed through the inside of the battery module. The first arrangement and the second arrangement may be such that arrangements of the first-electrode terminal and the second-electrode terminal with respect to the intake hole and the discharge hole are reversed from each other.

With this configuration, while the arrangement of the first-electrode terminal and the second-electrode terminal differ depending on the battery module, the arrangement of the intake hole and the discharge hole can be made the same, so that setting of the intake/discharge path is facilitated.

In the battery pack described above, the battery module may further include a signal line group bundling one or more signal lines that detect a state of the battery cell. The battery pack may include one or more insertion ports to which the signal line group is connected. A length of the signal line group drawn out from a draw-out port of the battery module may be longer than a distance from the draw-out port to the corresponding insertion port and shorter than a distance from the draw-out port to the non-corresponding insertion port.

With this configuration, it is possible to prevent wrong wire connection of the signal line group. Further, when there is arrangement error of the battery modules, there appears the battery module whose signal line group cannot be inserted into the insertion port, so that it is possible to effectively prevent arrangement error of the battery modules and thus wrong wire connection between the battery modules.

In the battery pack described above, the plurality of battery modules may be arranged two-dimensionally so as to be arranged in plurality in a width direction of the battery module and in even number in a height direction of the battery module.

With this configuration, it is possible to arrange more battery modules while suppressing the horizontal size.

In the battery pack described above, the first-electrode terminal and the second-electrode terminal may be provided at both depth-direction end faces of the battery module.

With this configuration, since the first-electrode terminal and the second-electrode terminal are not covered by the adjacent battery modules, it is possible to easily carry out connection between the terminals.

According to the disclosure, the arrangement of the first-electrode terminal and the second-electrode terminal can be changed only by changing the first-electrode assembly. In other words, it is not necessary to change the shape or the like of a component other than the first-electrode assembly for the purpose of changing the arrangement of the first-electrode terminal and the second-electrode terminal. As a result, it is possible to arrange the first-electrode terminal and the second-electrode terminal at desired positions and to prevent wrong wire connection between the battery modules while suppressing an increase in the number of kinds of components.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
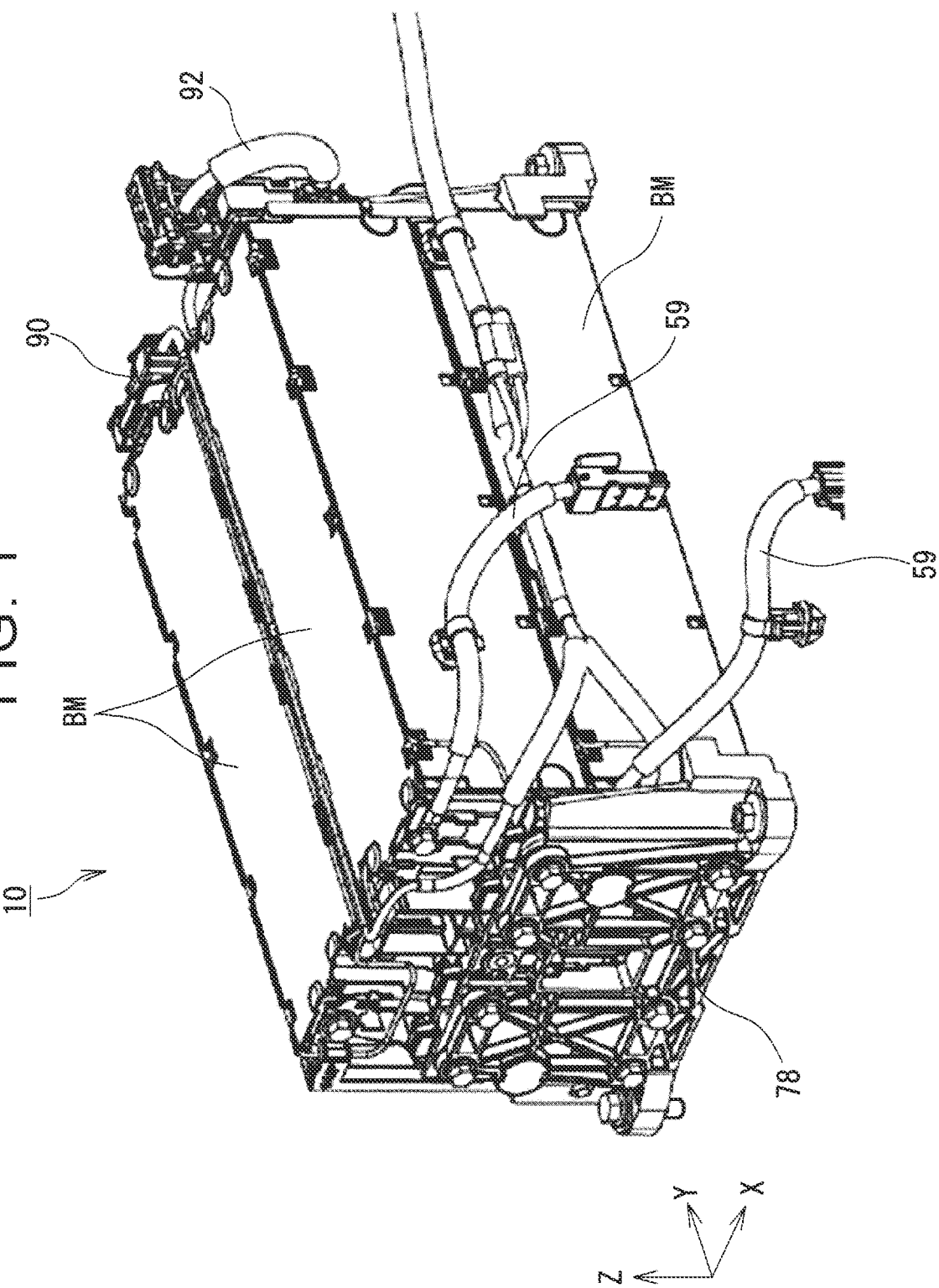
FIG. 1 is a perspective view of a four-set battery block.
Figure 2:
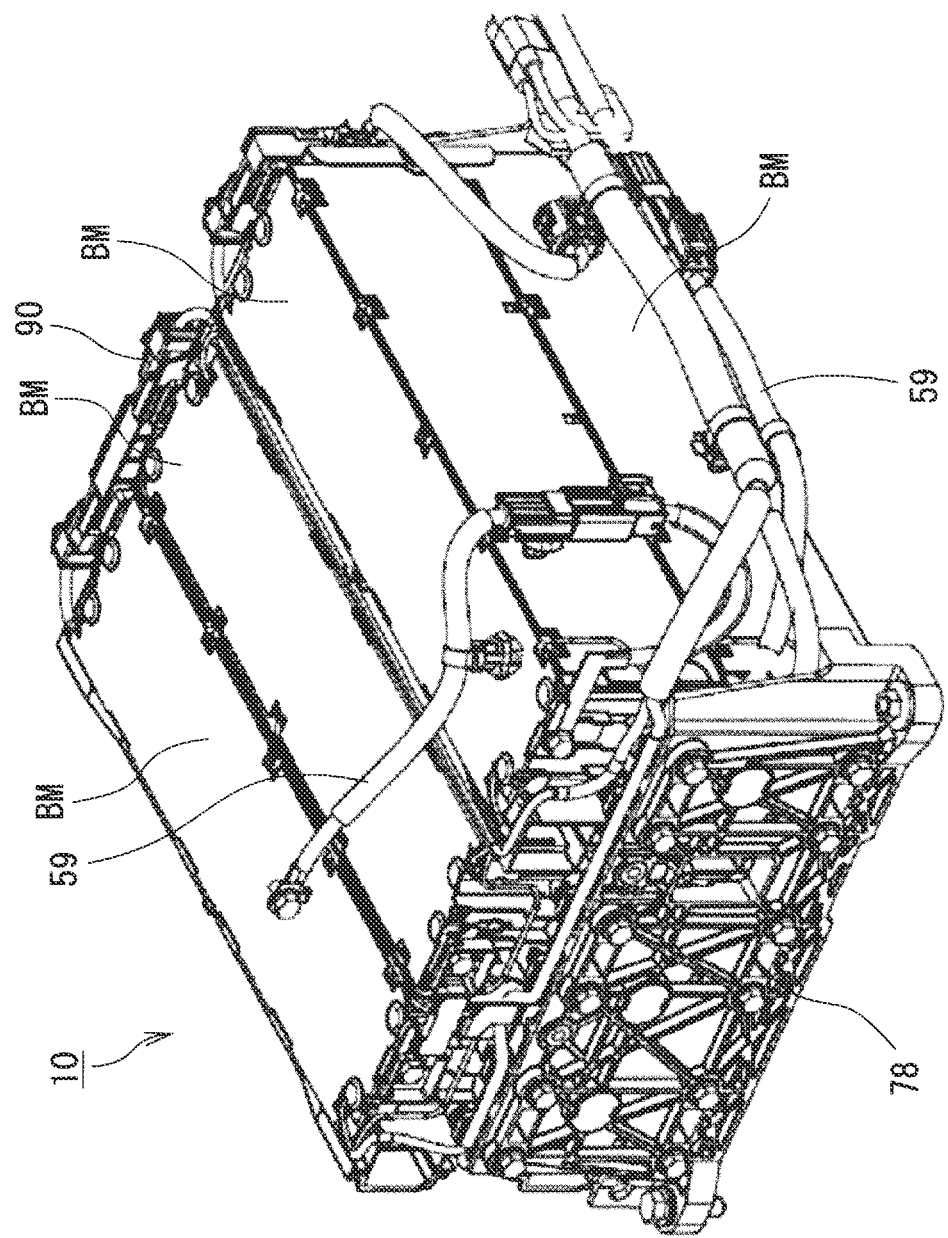
FIG. 2 is a perspective view of a six-set battery block.
Figure 3:
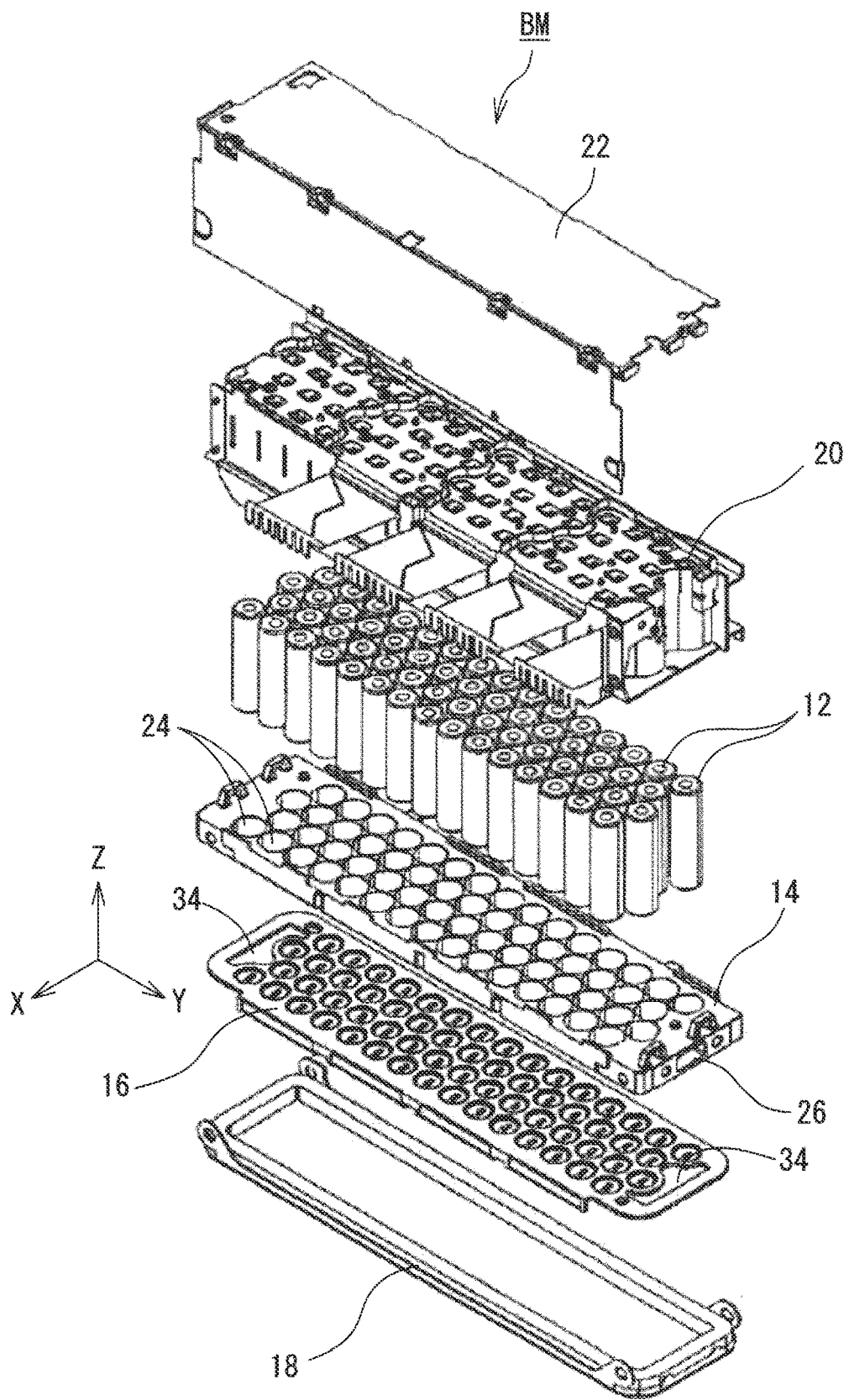
FIG. 3 is an exploded perspective view of a battery module.

Hereinbelow, an embodiment of the disclosure will be described with reference to the drawings. FIGS. 1 and 2 are perspective views of battery blocks 10 constituting a battery pack according to the embodiment of the disclosure. FIG. 3 is an exploded perspective view of a battery module BM. In the following description, a longitudinal direction of the battery module BM will be referred to as a "depth direction" or a "Y direction", a height direction of the battery module BM as a "height direction" or a "Z direction", and a direction perpendicular to the Y direction and the Z direction as a "width direction" or an "X direction".

The battery pack is formed by packaging chargeable and dischargeable secondary batteries. The battery pack is installed, for example, in an electrically driven vehicle such as an electric vehicle or a hybrid vehicle. The battery pack includes one or more battery blocks 10 in a housing thereof. The number of the battery blocks 10 included in the battery pack is not particularly limited as long as it is one or more. When the plurality of battery blocks 10 are provided, those battery blocks 10 are preferably connected in series to each other.

The battery block 10 is formed by unitizing a plurality of battery modules BM. The number of the battery modules BM constituting the battery block 10 is not particularly limited as long as it is two or more. The battery modules BM are preferably arranged two-dimensionally such that the battery modules BM are arranged in plurality in the width direction and in even number in the height direction. In this embodiment, the battery pack includes a four-set battery block 10 including four battery modules BM and a six-set battery block 10 including six battery modules BM. As shown in FIG. 1, the four-set battery block 10 is configured such that the two battery modules BM are arranged in the width direction and that the two battery modules BM are arranged in the height direction. As shown in FIG. 2, the six-set battery block 10 is configured such that the three battery modules BM are arranged in the width direction and that the two battery modules BM are arranged in the height direction. The configuration of the four-set battery block 10 is approximately the same as the configuration of the six-set battery block 10. Therefore, hereinbelow, a description will be given using mainly the configuration of the six-set battery block 10 as an example.

As shown in FIG. 3, the battery module BM includes a plurality of battery cells 12, a battery cell holder 14 holding the battery cells 12, a negative-electrode assembly 16 (second-electrode assembly), a positive-electrode assembly 20 (first-electrode assembly), a vent cover 18, and a protective cover 22. The battery cell 12 is a chargeable and dischargeable secondary battery cell. The battery cell 12 is, for example, a nickel-hydrogen battery cell or a lithium-ion battery cell that is housed in a cylindrical case. The battery cell 12 is provided at its both axial ends with a positive electrode (first electrode) and a negative electrode (second electrode) serving as electrodes of the battery cell 12. The battery cell 12 is also provided at its end face on the negative-electrode side with a discharge valve (not shown) that allows the discharge of gas generated in the battery cell 12. The battery module BM shown in FIG. 3 includes 60 battery cells 12, and these 60 battery cells 12 are arranged in an array of 4 rows and 15 columns. The 60 battery cells 12 are grouped per 15 battery cells to form four battery cell groups. The 15 battery cells 12 belonging to each battery cell group are connected in parallel to each other by a corresponding one of negative-electrode bus bar plates 28 (second-electrode bus bar plates) and a corresponding one of positive-electrode bus bar plates 40 (first-electrode bus bar plates) which will be described later. Each battery cell group including the 15 battery cells 12 connected in parallel to each other is connected in series to the other battery cell group or a positive-electrode terminal TP via a corresponding one of later-described inter-electrode bus bars 42.

The battery cells 12 are held upright with the directions of the positive electrodes and the negative electrodes aligned. In this embodiment, the battery cells 12 are held by the battery cell holder 14 in an upright posture in which their end faces with the negative electrodes face downward (the vent cover 18 side). The battery cells 12 are held by the battery cell holder 14 with their lower end portions received in receiving holes 24 that are provided in the battery cell holder 14. The battery cell holder 14 is generally plate-shaped, and the receiving holes 24 are arranged two-dimensionally in the plate plane. In this embodiment, the receiving holes 24 are arranged in an array of 4 rows and 15 columns, and the receiving holes 24 in the adjacent rows are offset by a half pitch.

The receiving hole 24 has a round hole shape that is fitted to the cylindrical shape of the battery cell 12. The battery cell 12 is inserted into the round hole 24 and fixed thereto with an adhesive. The receiving hole 24 penetrates the battery cell holder 14 in its thickness direction, so that the lower end of the battery cell 12 is exposed downward.

Figure 4:
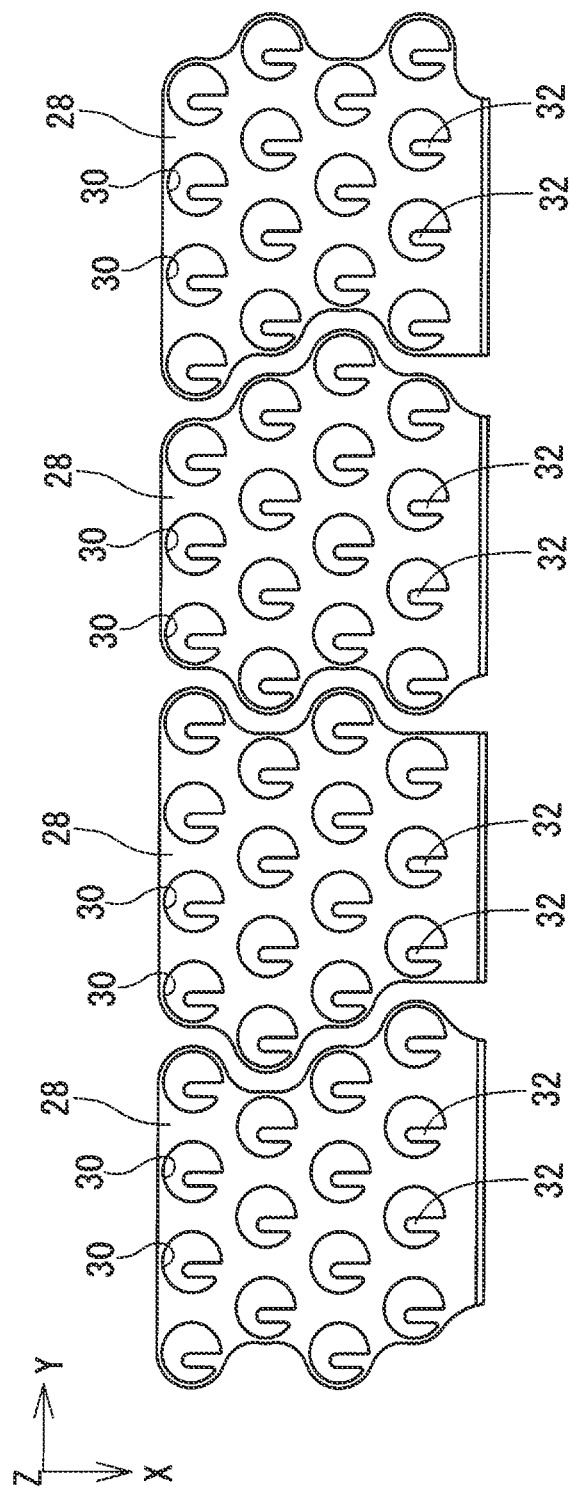
FIG. 4 is a plan view of negative-electrode bus bar plates.

The negative-electrode assembly 16 and the vent cover 18 are disposed below the battery cell holder 14. The negative-electrode assembly 16 includes four negative-electrode bus bar plates 28. The four negative-electrode bus bar plates 28 are integrated with each other by a resin in a state where the negative-electrode bus bar plates 28 are spaced apart from each other to maintain the insulation therebetween. FIG. 4 is a diagram showing one example of the negative-electrode bus bar plates 28. Each negative-electrode bus bar plate 28 electrically connects to each other the negative electrodes of the 15 battery cells 12 forming the battery cell group. The negative-electrode bus bar plate 28 is a flat plate member made of a conductive material such as copper. The negative-electrode bus bar plate 28 is provided with through-openings 30 corresponding to the arranged battery cells 12 and connecting pieces 32 extending from the peripheral edges of the through-openings 30. The tips of all the connecting pieces 32 are in contact with the negative electrodes of the corresponding battery cells 12, thereby electrically connecting the negative electrodes of the 15 battery cells 12 to each other.

The vent cover 18 is disposed on the lower side of the negative-electrode assembly 16. The vent cover 18 is a generally boat-shaped member with its peripheral edge raised upward. The peripheral edge of the vent cover 18 is adhered to the peripheral edge of the battery cell holder 14, thereby forming a sealed space between the vent cover 18 and the battery cell holder 14. This sealed space serves as a vent space in which gas discharged from the battery cells 12 flows. The gas discharged from the battery cells 12 into the vent space is discharged to the outside of the battery module BM via vent holes 34 formed at both Y-direction ends of the negative-electrode assembly 16 and vent passages 26 formed at both Y-direction ends of the battery cell holder 14, and then is led to a proper position via ducts or the like.

Figure 5:
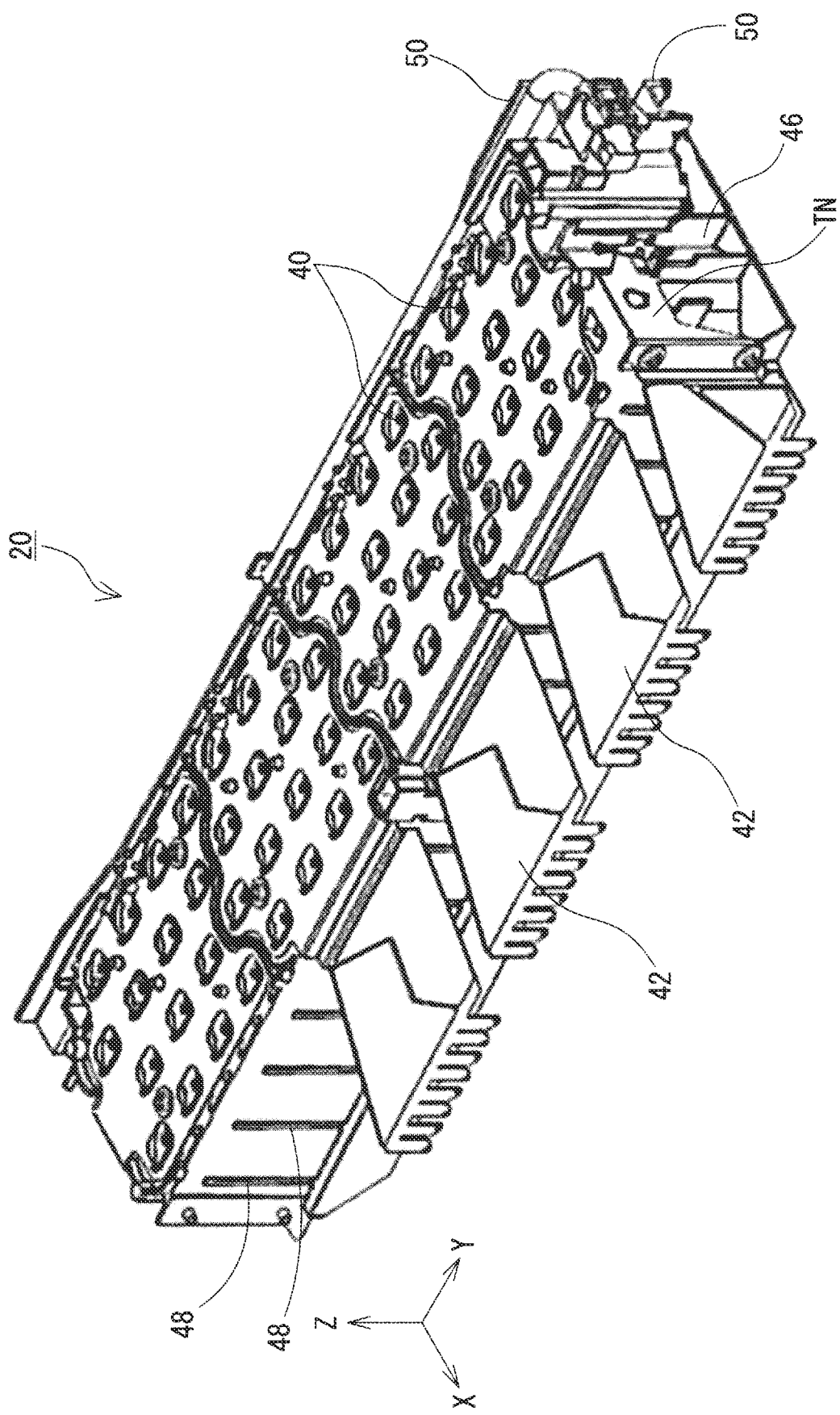
FIG. 5 is a perspective view of a positive-electrode assembly of a first pattern.
Figure 6:
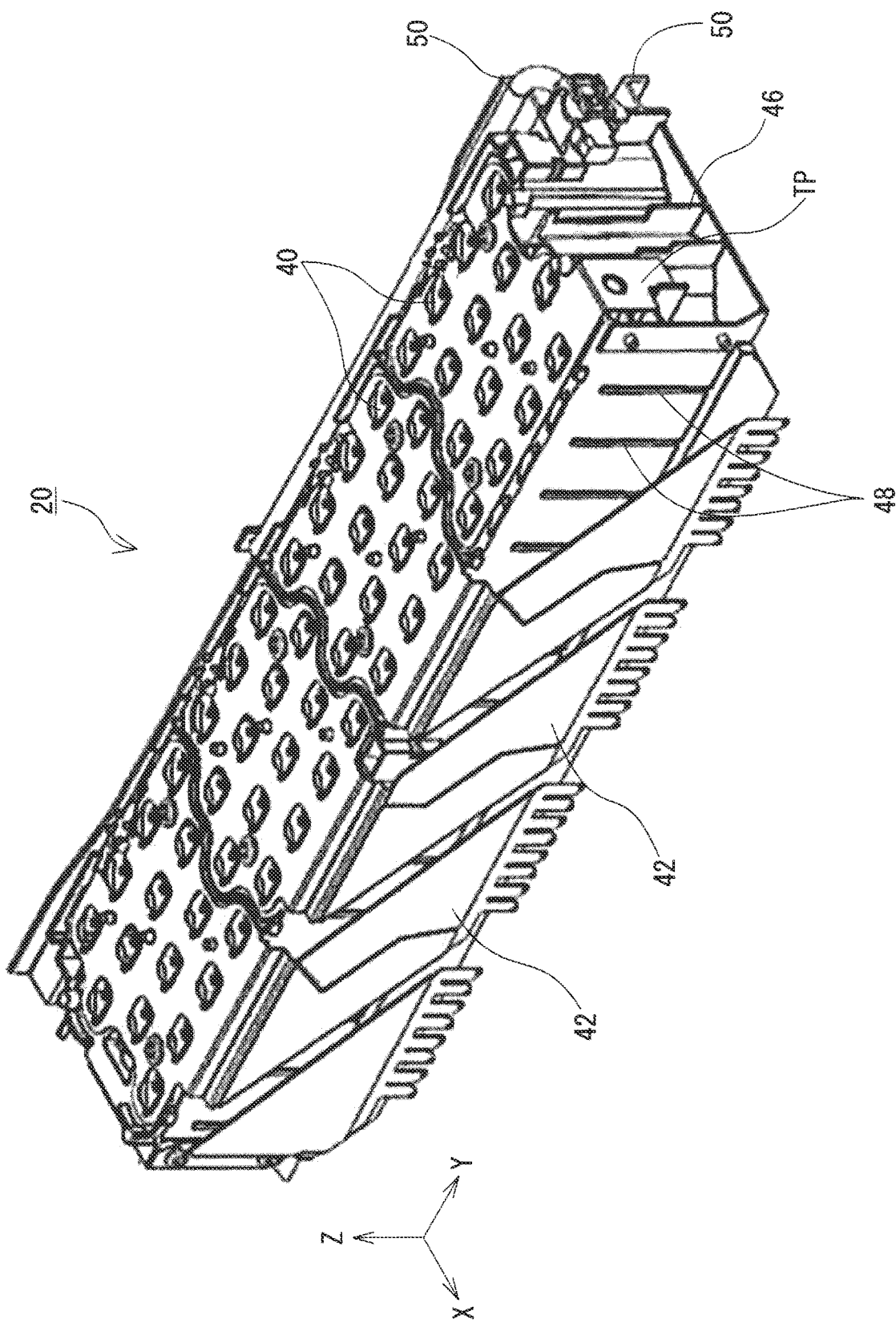
FIG. 6 is a perspective view of a positive-electrode assembly of a second pattern.

The positive-electrode assembly 20 is disposed on the side opposite to the negative-electrode assembly 16 with the battery cell holder 14 interposed therebetween. As will be described later in detail, there are the positive-electrode assembly 20 of a first pattern and the positive-electrode assembly 20 of a second pattern that differ in the arrangement of a positive-electrode terminal (one example of a first-electrode terminal) TP and a negative-electrode terminal (one example of a second-electrode terminal) TN. These positive-electrode assemblies 20 will be described with reference to FIGS. 5 and 6. FIG. 5 is a perspective view of the positive-electrode assembly 20 of the first pattern, while FIG. 6 is a perspective view of the positive-electrode assembly 20 of the second pattern.

The positive-electrode assembly 20 is formed by attaching the positive-electrode bus bar plates 40, the inter-electrode bus bars 42, the positive-electrode terminal TP, the negative-electrode terminal TN, an insulating plate (not shown in FIGS. 5 and 6), and so on to an exterior case 46 that covers the battery cells 12, and by integrating them together. The exterior case 46 is a generally box-shaped member covering around the battery cells 12 and is made of an insulating resin or the like. A plurality of slits are provided at both width-direction ends of the exterior case 46. The slits formed at the one width-direction end serve as intake holes 49 (not seen in FIGS. 3 to 5; see FIG. 10) for leading cooling air into the exterior case 46, while the slits formed at the other width-direction end serve as discharge holes 48 for leading the cooling air to the outside of the exterior case 46. Further, at the one width-direction end, two flanges 50 each generally L-shaped in cross section are provided at an interval in the height direction (see FIG. 10). The flanges 50 are adhered to the adjacent other members to form a cooling passage in which cooling air flows. This will be described later in detail.

The configuration of the positive-electrode bus bar plates 40 is substantially the same as the configuration of the negative-electrode bus bar plates 28. That is, the positive-electrode assembly 20 includes four positive-electrode bus bar plates 40 arranged at intervals, and each positive-electrode bus bar plate 40 is provided with 15 through-openings and 15 connecting pieces.

The negative-electrode terminal TN and the positive-electrode terminal TP are portions serving as power output terminals of the entire battery module BM and are provided at both depth-direction end faces of the battery module BM. Specifically, as shown in FIG. 5, the negative-electrode terminal TN is provided at the one depth-direction end face of the positive-electrode assembly 20. The negative-electrode terminal TN is a conductive plate member that is electrically connected to a later-described inter-module bus bar B. As shown in FIG. 6, the positive-electrode terminal TP is formed integrally with one of the positive-electrode bus bar plates 40 and located at the other depth-direction end face of the battery module BM (not seen in FIGS. 3 and 5). The positive-electrode terminal TP is also electrically connected to a later-described inter-module bus bar B.

Herein, the arrangements of the negative-electrode terminal TN and the positive-electrode terminal TP differ from each other in the first pattern shown in FIG. 5 and the second pattern shown in FIG. 6. That is, in the first pattern shown in FIG. 5, the arrangement is a first arrangement in which the negative-electrode terminal TN is located on the right side when directly facing the discharge holes 48. On the other hand, in the second pattern shown in FIG. 6, the arrangement is a second arrangement in which the positive-electrode terminal TP is located on the right side when directly facing the discharge holes 48.

In this embodiment, the positive-electrode terminal TP and the negative-electrode terminal TN are provided at both end faces in the depth direction. The reason for this arrangement is to facilitate connection to inter-module bus bars B. That is, in this embodiment, as described above, the battery block 10 is formed by disposing the battery modules BM two-dimensionally. In this event, there is a possibility that both width-direction side surfaces or both height-direction surfaces (top surface and bottom surface) of the battery module BM are covered by the adjacent battery modules BM and thus are difficult to access. On the other hand, both end faces in the depth direction are always exposed to the outside even when the battery modules BM are disposed two-dimensionally, and thus are easy to access, so that the inter-module bus bars B can be easily connected thereto.

The inter-electrode bus bar 42 is a conductive member that establishes connection between the negative-electrode bus bar plate 28 and one of the positive-electrode bus bar plate 40 and the negative-electrode terminal TN. The four inter-electrode bus bars 42 are provided such that the four inter-electrode bus bars 42 face the discharge holes 48 and are disposed at positions outside the discharge holes 48. A lower end of each inter-electrode bus bar 42 is connected to the negative-electrode bus bar plate 28 belonging to one of the battery cell groups, while an upper end thereof is connected to one of the positive-electrode bus bar plate 40 belonging to the other battery cell group adjacent to the one of the battery cell groups and the negative-electrode terminal TN. In this way, the four battery cell groups are connected in series to each other by the four inter-electrode bus bars 42. Herein, the shape of the inter-electrode bus bar 42 differs per pattern. That is, in the first pattern shown in FIG. 5, the inter-electrode bus bar 42 has a diagonally right-up shape when directly facing the discharge holes 48. In the second pattern shown in FIG. 6, the inter-electrode bus bar 42 has a diagonally right-down shape when directly facing the discharge holes 48. Since the shape of the inter-electrode bus bar 42 differs per pattern in this way, the arrangement of the negative-electrode terminal TN and the positive-electrode terminal TP differs per pattern.

Figure 10:
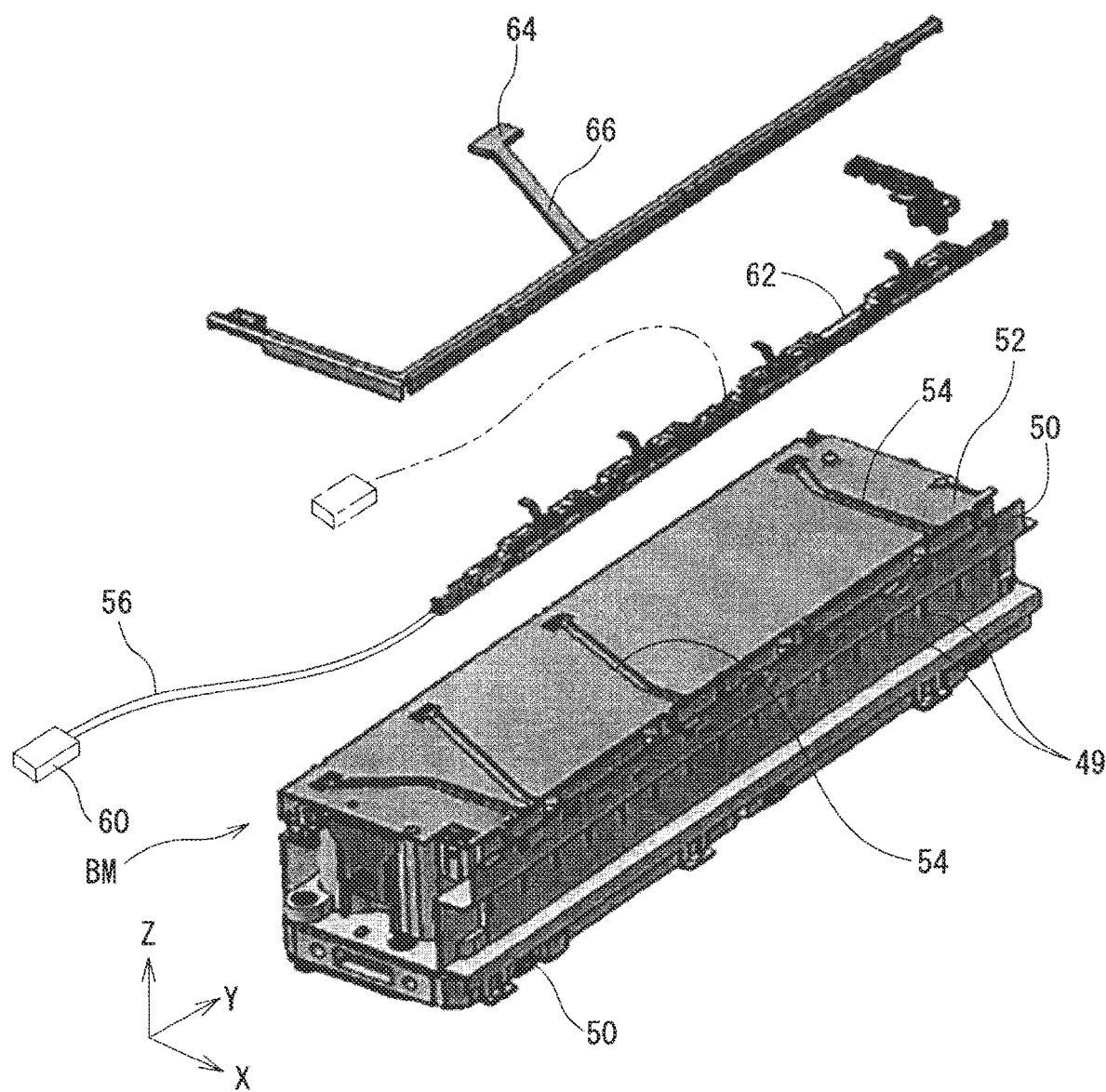
FIG. 10 is a perspective view of the battery module.

An insulating plate 52 is a plate member disposed on the upper side of the positive-electrode bus bar plates 40 and covering the positive-electrode bus bar plates 40. As shown in FIG. 10, the insulating plate 52 is formed at its upper surface with receiving grooves 54 that respectively receive voltage detection lines therein. The voltage detection line is a signal line for detecting a voltage of the corresponding battery cell group. A base end of the voltage detection line is connected to the corresponding positive-electrode bus bar plate 40. In this embodiment, the battery module BM is provided with the four battery cell groups. Therefore, the number of the voltage detection lines provided to the battery module BM is four and thus the number of the receiving grooves 54 formed in the insulating plate 52 is also four. The four voltage detection lines drawn out from the positive-electrode bus bar plates 40 are connected to a routing member 62 disposed at one width-direction end (end on the intake hole 49 side) of the battery module BM. A detection line group (one example of a signal line group) 56 bundling the four voltage detection lines is drawn out from one end of the routing member 62. A voltage connector 60 is attached to a distal end of the detection line group 56. The connection relationship between the detection line groups 56 (voltage detection lines) and other members will be described later in detail. In FIG. 10, the detection line group 56 is drawn out from this side in the depth direction (the left side of the sheet) of the routing member 62. In this case, when a connection destination of the detection line group 56 is located on the far side in the depth direction (the right side of the sheet), it is necessary to largely detour the detection line group 56. Therefore, as shown by a two-dot chain line in FIG. 10, the detection line group 56 may be drawn out from an approximately middle position (approximately middle position in the depth direction of the battery module BM) of the routing member 62. By drawing out from the middle position, it can be dealt with relatively easily regardless of whether the connection destination of the detection line group 56 is located on this side or the far side in the depth direction.

The battery module BM is further provided with a temperature sensor 64, such as a thermistor, for detecting a temperature of the battery module BM. A temperature detection line 66 drawn out from the temperature sensor 64 is also drawn out from the battery module BM and connected to a control circuit.

Referring again to FIG. 3, the protective cover 22 is further disposed above the positive-electrode assembly 20. The protective cover 22 is a generally L-shaped member covering an upper surface and one side surface of the positive-electrode assembly 20, i.e. the placement planes of the positive-electrode bus bar plates 40 and the inter-electrode bus bars 42. The protective cover 22 is made of an insulating material such as a resin.

Figure 7:
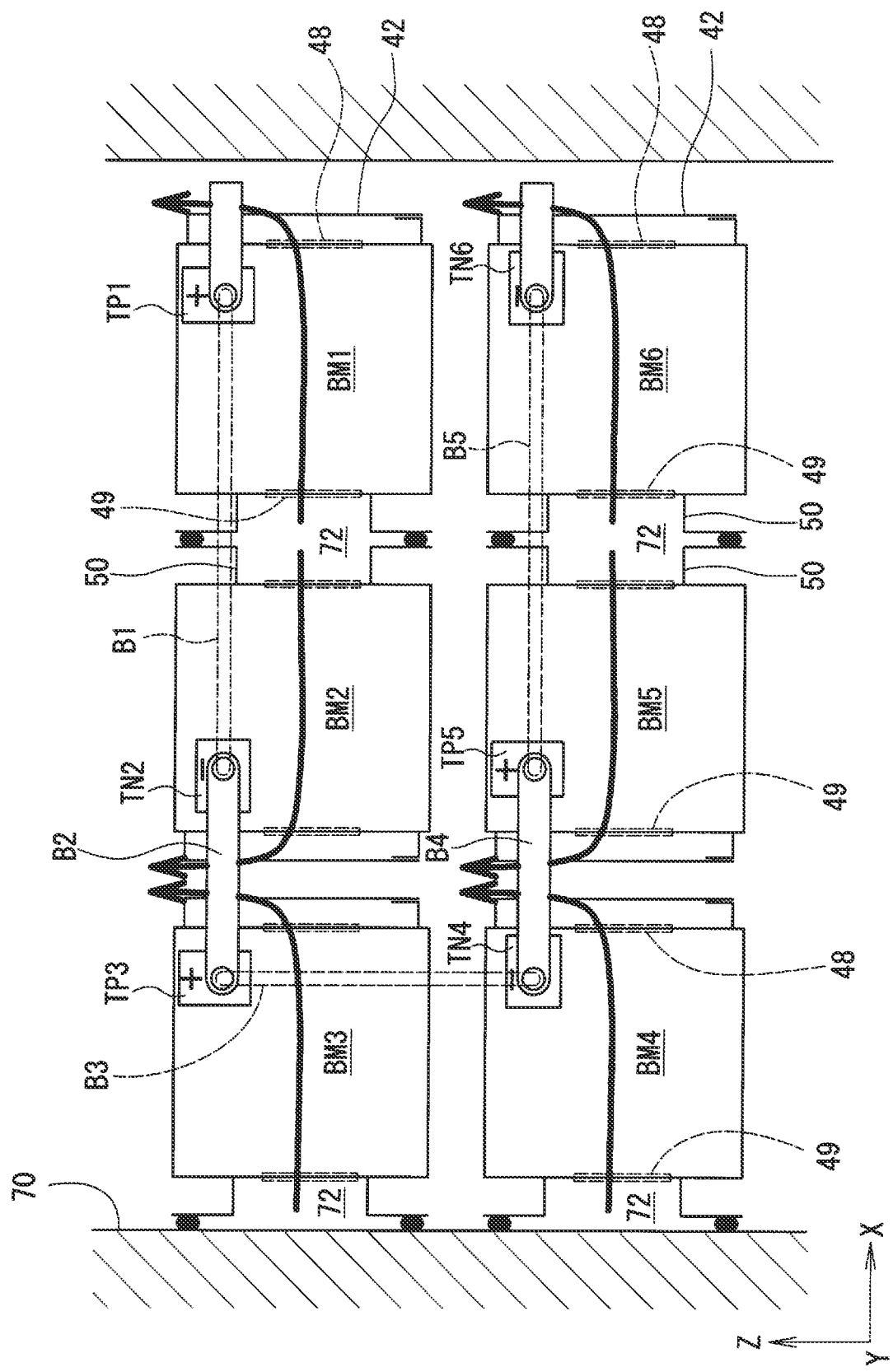
FIG. 7 is a schematic front view of the six-set battery block.
Figure 8:
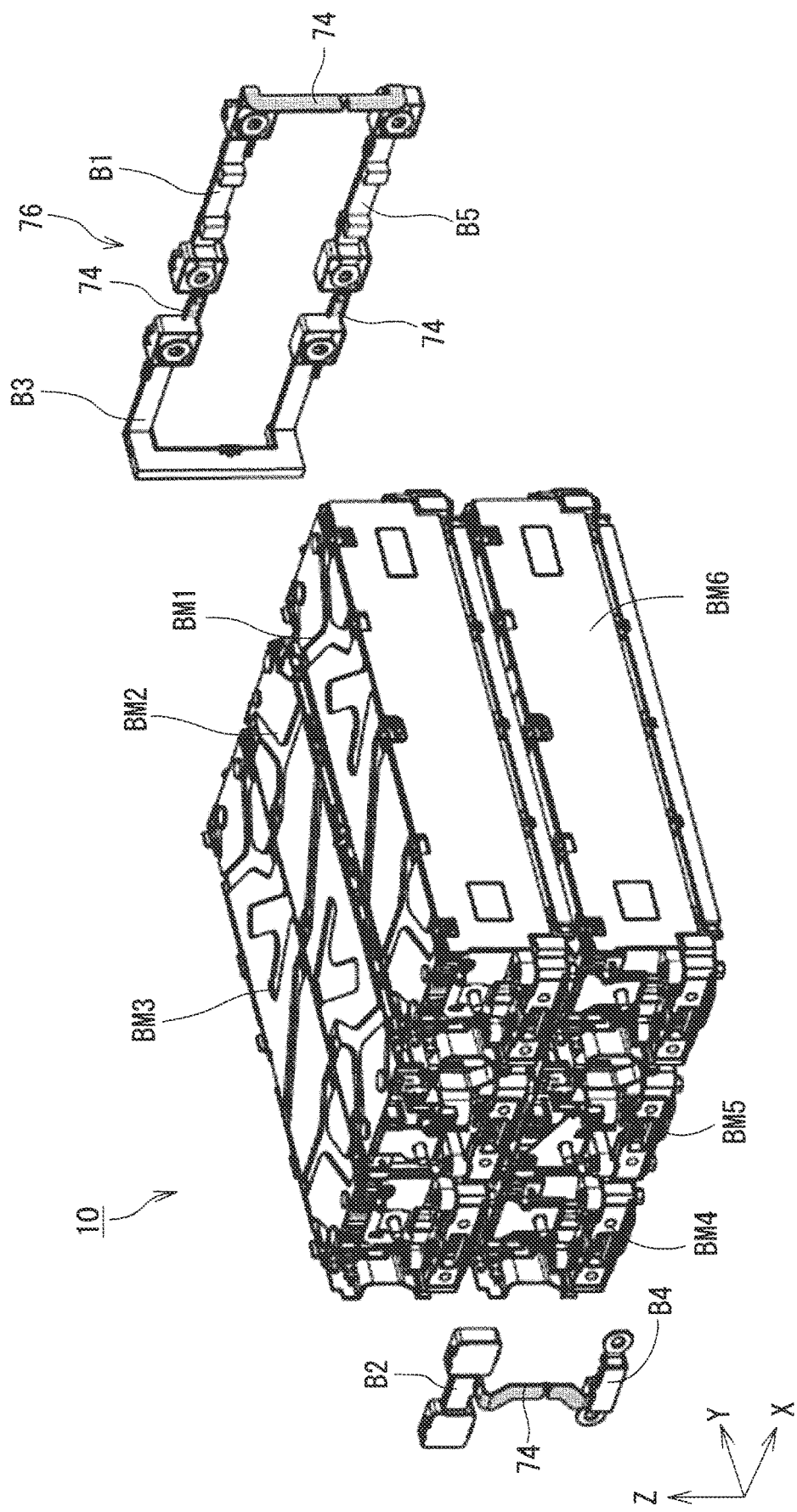
FIG. 8 is a perspective view of the six-set battery block.

The arrangement of the battery modules BM thus configured will be described with reference to FIGS. 7 and 8. FIG. 7 is a schematic front view of the six-set battery block 10. FIG. 8 is a perspective view of the six-set battery block 10. Herein, in order to facilitate the description, the six battery modules BM will be referred to as a "first battery module BM1", a "second battery module BM2", ..., a "sixth battery module BM6" in the order in a counterclockwise direction from the upper right as facing the front. Further, as needed, the positive-electrode terminal and the negative-electrode terminal of the i-th battery module BMi will be denoted by "TPi" and "TNi", respectively.

In this embodiment, as shown in FIG. 7, the flanges 50 projecting from the side surface of one of the battery modules BM are adhered to the flanges 50 of the other battery module BM adjacent thereto in the width direction or to a housing 70 of the battery pack, thereby forming an intake passage 72 of a generally rectangular shape in cross section. Cooling air supplied to the intake passage 72 flows into the battery module BM from the intake holes 49 formed in the one width-direction end face of the battery module BM and cools the battery cells 12. The cooling air having passed through the inside of the battery module BM flows out of the discharge holes 48 formed in the other width-direction end face of the battery module BM. In order to form such an intake passage 72, the battery modules BM adjacent to each other in the width direction are disposed such that the arrangements of the intake holes 49 and the discharge holes 48 have a mirror-image relationship.

In this embodiment, the six battery modules BM1 to BM6 constituting the battery block 10 are connected in series to each other using inter-module bus bars B1 to B5.

In FIG. 7, the inter-module bus bars B2 and B4 located on this side in the drawing are shown by solid lines, while the inter-module bus bars B1, B3, and B5 located on the far side in the drawing are shown by broken lines. As shown in FIG. 7, the negative-electrode terminal TN1 and the positive-electrode terminal TP2 that are located on the far side in the drawing are connected to each other by the inter-module bus bar B1 extending in the width direction. Likewise, the negative-electrode terminal TN2 and the positive-electrode terminal TP3 are connected to each other by the inter-module bus bar B2 extending in the width direction, the negative-electrode terminal TN4 and the positive-electrode terminal TP5 by the inter-module bus bar B4 extending in the width direction, and the negative-electrode terminal TN5 and the positive-electrode terminal TP6 by the inter-module bus bar B5 extending in the width direction. Further, the negative-electrode terminal TN3 and the positive-electrode terminal TP4 are connected to each other by the inter-module bus bar B3 extending in the height direction.

The positive-electrode terminal TP1 of the first battery module BM1 serves as a positive-electrode terminal of the entire battery block 10 and is connected to a negative-electrode terminal of another battery block 10 or an output terminal of the battery pack via a power line 59 (see FIGS. 1 and 2). The negative-electrode terminal TN6 of the sixth battery module BM6 serves as a negative-electrode terminal of the entire battery block 10 and is connected to a positive-electrode terminal of another battery block 10 or an output terminal of the battery pack via a power line 59.

In FIG. 7, the inter-module bus bars B1 to B5 are shown as conductive plate members that are independent of each other. On the other hand, as shown in FIG. 8, the inter-module bus bars may be integrated with each other via a resin 74. In FIG. 8, the inter-module bus bar B2 connecting between "TN2" and "TP3" and the inter-module bus bar B4 connecting between "TN4" and "TP5" are integrated with each other via the resin 74. Further, in FIG. 8, the inter-module bus bar B1 connecting between "TN1" and "TP2", the inter-module bus bar B3 connecting between "TN3" and "TP4", and the inter-module bus bar B5 connecting between "TN5" and "TP6" are integrated with each other via the resin 74. By integrating the inter-module bus bars with each other via the resin 74, it is possible to reduce the number of the components. Further, when the inter-module bus bars B1, B3, and B5 are integrated with each other to form an integrated component 76, since an attachable portion of the integrated component 76 is limited, it is also possible to effectively prevent wrong wire connection. That is, the integrated component 76 is the component that should be disposed on the far side in the depth direction (the right side of the sheet of FIG. 8). Even if it is attempted to attach the integrated component 76 to this side in the depth direction (the left side of the sheet of FIG. 8), the inter-terminal distances do not match, so that the integrated component 76 cannot be attached. As a result, it is possible to effectively prevent wrong wire connection in which the inter-module bus bars B1, B3, and B5 are erroneously attached to the wrong terminals.

Herein, in this embodiment, in order to shorten the inter-module bus bars B1 to B5, the battery modules BM are disposed such that the positional relationships between the positive-electrode terminals TP and the negative-electrode terminals TN of the battery modules BM adjacent to each other in the width direction and in the height direction are reversed from each other. That is, when the first battery module BM1 is disposed such that the positive-electrode terminal TP1 is located on this side as facing the front, the second battery module BM2 adjacent to the first battery module BM1 in the width direction and the sixth battery module BM6 adjacent to the first battery module BM1 in the height direction are disposed such that the negative-electrode terminals TN2 and TN6 are located on this side as facing the front. Further, when the second battery module BM2 is disposed such that the negative-electrode terminal TN2 is located on this side as facing the front, the first, third, and fifth battery modules BM1, BM3, and BM5 adjacent to the second battery module BM2 in the width direction and in the height direction are disposed such that the positive-electrode terminals TP1, TP3, and TP5 are located on this side as facing the front. With this configuration, the terminal of different polarity is present near each terminal in the width direction or in the height direction, so that it is possible to shorten the inter-module bus bars B1 to B5 that connect the terminals of different polarities to each other. By shortening the inter-module bus bars B1 to B5, it is possible to reduce the heat generation that is caused due to resistance between the battery modules. Further, when the inter-module bus bars B1 to B5 are shortened, the accessible range of the inter-module bus bars B1 to B5 is narrowed correspondingly, so that it is possible to significantly reduce the possibility of connection to a wrong portion, i.e. the possibility of wrong wire connection.

As is clear from the description given above, in this embodiment, the battery modules BM are disposed such that the arrangements of the intake holes 49 and the discharge holes 48 of the battery modules BM adjacent to each other in the width direction have the mirror-image relationship and that the positional relationships between the positive-electrode terminals TP and the negative-electrode terminals TN of the battery modules BM adjacent to each other in the width direction and in the height direction are reversed from each other. With this configuration, two kinds of the battery modules BM that differ in the arrangement of the positive-electrode terminal TP and the negative-electrode terminal TN are required.

Specifically, in the first to third battery modules BM1 to BM3, when directly facing the discharge holes 48, the positive-electrode terminals TP1 to TP3 are located on the left side and the negative-electrode terminals TN1 to TN3 are located on the right side, while, in the fourth battery module BM4 to the sixth battery module BM6, when directly facing the discharge holes 48, the positive-electrode terminals TP4 to TP6 are located on the right side and the negative-electrode terminals TN4 to TN6 are located on the left side. In order to obtain these two kinds of the battery modules BM1 to BM3 and BM4 to BM6, the positive-electrode assemblies 20 of the two patterns are prepared in this embodiment.

That is, in this embodiment, there are prepared the positive-electrode assembly 20 of the first pattern in which the negative-electrode terminal TN is located on the right side as facing the discharge holes 48 as shown in FIG. 5, and the positive-electrode assembly 20 of the second pattern in which the positive-electrode terminal TP is located on the right side as facing the discharge holes 48 as shown in FIG. 6. On the other hand, the other configurations such as, for example, the configurations of the battery cell holder 14, the negative-electrode assembly 16, and the vent cover 18 are the same in all the battery modules BM. Accordingly, only by changing the positive-electrode assembly 20, it is possible to make a difference in the arrangement of the positive-electrode terminal TP and the negative-electrode terminal TN in the battery module BM. Consequently, while properly maintaining the arrangements of the intake holes 49 and the discharge holes 48, it is possible to shorten the inter-module bus bars B and thus to reduce the amount of heat generation and to prevent wrong wire connection.

While the description has been given using the six-set battery block 10 as the example in FIGS. 7 and 8, the third battery module BM3 and the fourth battery module BM4 are omitted in the case of the four-set battery block 10. In this case, the inter-module bus bars B2, B3, and B4 are also omitted, and instead, an inter-module bus bar is provided for connection between TN2 and TP5.

Figure 9:
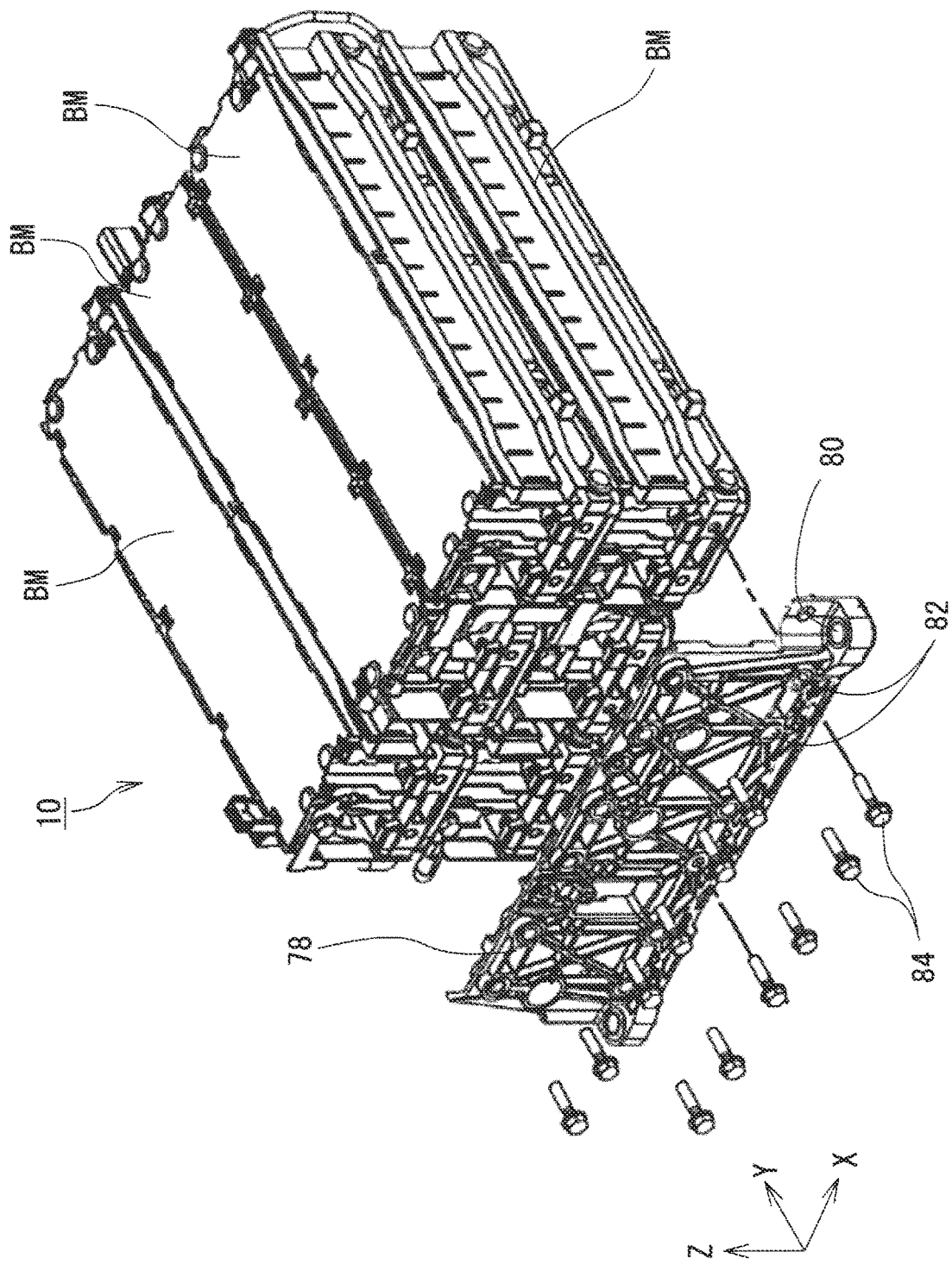
FIG. 9 is a perspective view showing a state of attaching an end plate.

The battery block 10 configured as described above is fixed to the housing 70 of the battery pack via end plates 78. FIG. 9 is a perspective view showing a state of attaching the end plate 78. The end plates 78 are plate members that are attached to both depth-direction ends of the battery block 10. The end plate 78 is formed at its both width-direction ends with fixing holes 80 through which fixing bolts (not shown)

that are screwed into the housing 70 are inserted. Further, the end plate 78 is formed with a plurality of joining holes 82. Joining bolts 84 that are screwed into the battery modules BM1 to BM6 are inserted through the joining holes 82. In other words, the battery modules BM1 to BM6 constituting the battery block 10 are screwed to the end plate 78 so as to be integrated with each other. In further other words, in this embodiment, the battery modules BM1 to BM6 share one fixing member (end plate 78). With this configuration, compared to a case where a fixing member is prepared for each of the battery modules BM, it is possible to reduce the number of the components and thus to mount the battery modules BM while saving a space.

As described above, the voltage detection lines each for detecting a voltage of the corresponding battery cell group are connected to the positive-electrode bus bar plates 40. As shown in FIG. 10, the battery module BM is provided with the four voltage detection lines, and these four voltage detection lines are bundled as the detection line group 56 and drawn out to the outside of the battery module BM from a draw-out port provided at one depth-direction end of the battery module BM. The voltage connector 60 is connected to the distal end of the detection line group 56.

Herein, the six-set battery block 10 is provided with 24 voltage detection lines (six detection line groups 56), while the four-set battery block 10 is provided with 16 voltage detection lines (four detection line groups 56). These voltage detection lines are finally connected to terminals in a control circuit (not shown). In this event, if the voltage detection lines are partially connected to a non-corresponding terminal in error (wrong wire connection), it is not possible to properly manage the voltages of the battery cell groups. In this embodiment, in order to prevent such wrong wire connection, a protector 90 is provided at the other depth-direction end of the battery block 10, and the length of the detection line group 56 is changed per battery module BM.

Figure 11:
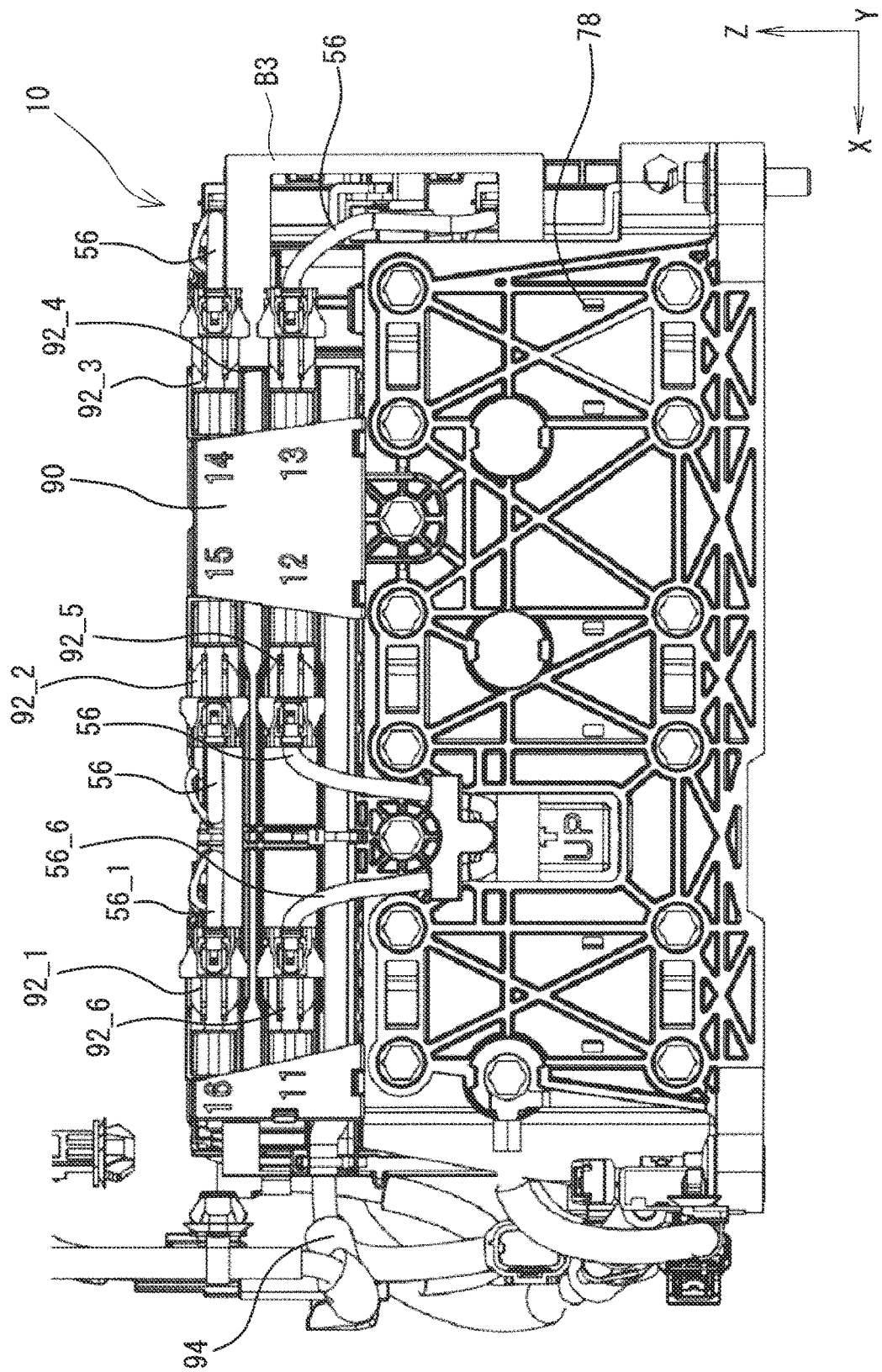
FIG. 11 is a rear view of the six-set battery block.

FIG. 11 is a rear view of the six-set battery block 10. The protector 90 includes a plurality of connector insertion ports 92_1 to 92_6 (hereinafter referred to as "connector insertion ports 92" when not distinguishing between 92_1 to 92_6), internal wiring (not shown), and a signal line bundle 94. The voltage connectors 60 of the detection line groups 56 drawn out from the battery modules BM are respectively inserted into the connector insertion ports 92. The number of the connector insertion ports 92 is the same as the number of the battery modules BM constituting the battery block 10. The protector 90 is provided therein with internal wiring that establishes electrical connection between the signal line bundle 94 and the detection line groups 56 (voltage detection lines) inserted into the connector insertion ports 92. The signal line bundle 94 is a bundle of a plurality of signal lines and has a distal end that is connected to a control circuit (not shown). When the voltage connectors 60 are inserted into the connector insertion ports 92, the voltage detection lines drawn out from the battery modules BM are connected to the signal line bundle 94 in a state of being properly routed by the internal wiring. Signals of the voltage detection lines can be connected to the control circuit in a properly distributed state. With this configuration, it is possible to effectively prevent wrong wire connection of the voltage detection lines.

In this embodiment, by adjusting the lengths of the detection line groups 56 and the positions of the connector insertion ports 92, wrong wire connection of the voltage detection lines is prevented more reliably. That is, even by providing the protector 90, wrong wire connection occurs when the voltage connectors 60 are inserted into the wrong insertion destinations. Therefore, in this embodiment, in order to prevent insertion error of the voltage connectors 60, a length L1 of the detection line group 56 drawn out from the draw-out port of each of the battery modules BM is set to a length that corresponds to a distance L2 from the draw-out port to the corresponding connector insertion port 92. Specifically, the length L1 of the detection line group 56 is set to be longer than the distance L2 to the corresponding connector insertion port 92 and to be shorter than a distance L3 to the non-corresponding connector insertion port 92 (L2<L1<L3). In the example of FIG. 11, the detection line group 56_1 of the first battery module BM1 should be connected to the first connector insertion port 92_1. In this case, the length of the detection line group 56_1 of the first battery module BM1 is longer than the distance from the draw-out port to the first connector insertion port 92_1, but is shorter than the distances from the draw-out port to the second connector insertion port 92_2 and to the sixth connector insertion port 92_6. Therefore, even when it is attempted to insert the voltage connector 60 of the detection line group 56_1 of the first battery module BM1 into the second connector insertion port 92_2 or the sixth connector insertion port 92_6, since the length is insufficient, it is possible to reliably prevent insertion error of the voltage connector 60 and thus to reliably prevent wrong wire connection of the voltage detection lines.

Further, when the length of the detection line group 56 is changed per battery module BM as described above, it is also possible to effectively prevent arrangement error of the battery modules BM. That is, as shown in FIG. 7, normally, the first battery module BM1 should be arranged in the upper row, while the sixth battery module BM6 should be arranged in the lower row. However, it may occur that the first battery module BM1 is arranged in the lower row, while the sixth battery module BM6 is arranged in the upper row by mistake. Even in this case, the intake passages 72 can be formed, and although the terminals TN and TP are reversed in polarity, positionally, the terminals TN and TP are arranged at the proper positions, so that the inter-module bus bars B1 and B5 can also be attached. However, when the first and sixth battery modules BM1 and BM6 are arranged at the vertically reversed positions, since the detection line group 56 drawn out from the first battery module BM1 is short, it cannot be connected to any of the connector insertion ports 92. As a result, a worker can certainly notice that arrangement error of the battery modules BM1 and BM6 has occurred, so that it is possible to effectively prevent wrong wire connection between the battery modules BM.

As described above, according to this embodiment, the inter-module bus bars can be shortened by properly using the positive-electrode assemblies 20 of the two patterns. This makes it possible to reduce the amount of heat generation and to effectively prevent wrong wire connection between the battery modules. Further, by setting the length of the detection line group 56 (voltage detection lines) to differ per battery module BM, it is possible to effectively prevent wrong wire connection of the voltage detection lines and wrong wire connection between the battery modules BM. The configurations described above are only by way of example. As long as assemblies of two patterns are prepared and the arrangement of a positive-electrode terminal TP and a negative-electrode terminal TN can be changed only by changing the pattern of the assembly to be used, the other configurations may be changed as appropriate.

What is claimed is:
1. A battery pack comprising:
   a plurality of battery modules connected in series to each other, wherein each of the plurality of battery modules includes:
a plurality of battery cells, a battery cell holder holding the plurality of battery cells, a positive-electrode assembly, a negative-electrode assembly, and a cover,
the positive-electrode assembly including positive-electrode bus bar plates, a positive-electrode terminal, a negative-electrode terminal, and at least one inter-electrode bus bar,
the negative-electrode assembly including negative-electrode bus bar plates,
the positive-electrode bus bar plates each electrically connecting positive electrodes of two or more of the plurality of battery cells to each other,
the positive-electrode terminal connected to one of the positive-electrode bus bar plates,
the negative-electrode terminal connected to one of the negative-electrode bus bar plates,
the at least one inter-electrode bus connecting one of the negative-electrode bus bar plates to one of the positive-electrode bus bar plates or the negative-electrode terminal, the negative-electrode bus bar plates each electrically connecting negative electrodes of two or more of the plurality of battery cells to each other,
the cover covering at least a part of the battery module,
wherein, each of the plurality of battery modules has one of a first pattern or a second pattern for the positive-electrode assembly therein, so that the battery pack comprises at least one of the plurality of battery modules having the first pattern and at least one of the plurality of the battery modules having the second pattern, the positive-electrode terminal and the negative-electrode terminal are arranged in a first arrangement in the first pattern, and the positive-electrode terminal and the negative-electrode terminal are arranged in a second arrangement in the second pattern, the second arrangement being different from the first arrangement,
the plurality of battery modules of the battery pack are arranged two-dimensionally so as to be arranged in a plurality in a width direction of the battery modules and in even number in a height direction of the battery modules,
the positive-electrode terminal and the negative-electrode terminal are provided at both depth-direction end faces of the battery modules, and
the plurality of battery modules of the battery pack are arranged with respect to each other so that the plurality of battery modules having the positive-electrode assembly in the first pattern are disposed adjacent to the plurality of battery modules having the positive-electrode assembly in the second pattern, wherein the positive-electrode terminals and the negative-electrode terminals of the battery modules adjacent to each other in the width direction are reversed from each other, and the positive-electrode terminals and the negative-electrode terminals of the battery modules adjacent to each other in the height direction are reversed from each other.

2. The battery pack according to claim 1, wherein
all of the plurality of battery modules are identical with respect to the plurality of battery cells, the battery cell holder, the negative-electrode assembly, and the cover.

3. The battery pack according to claim 1, wherein
for each of the plurality of batter modules, the positive-electrode assembly has an intake hole and a discharge hole,
the intake hole is arranged so as to lead cooling air into the battery module,
the discharge hole is arranged so as to discharge the cooling air having passed through an inside of the battery module, and
the first arrangement and the second arrangement are such that arrangements of the positive-electrode terminal and the negative-electrode terminal with respect to the intake hole and the discharge hole are reversed from each other.

4. The battery pack according to claim 1, wherein
each battery module of the plurality of the battery modules further includes a signal line group bundling one or more signal lines that detect a state of the battery cell,
the battery pack includes one or more insertion ports to which the signal line group is connected, and
a length of the signal line group drawn out from a draw-out port of the battery module is longer than a distance from the draw-out port to the corresponding insertion port and shorter than a distance from the draw-out port to the non-corresponding insertion port.

* * * * *